United States Patent
Al-Mulhem et al.

(10) Patent No.: US 10,989,030 B2
(45) Date of Patent: *Apr. 27, 2021

(54) SYNTHETIC SWEET SPOTS IN TIGHT FORMATIONS BY INJECTION OF NANO ENCAPSULATED REACTANTS

(71) Applicant: Saudi Arabian Oil Company, Dhahran (SA)

(72) Inventors: Abdulrahman Abdulaziz Al-Mulhem, Dhahran (SA); Hazim Hussein Abass, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

This patent is subject to a terminal disclaimer.

(21) Appl. No.: 16/432,589

(22) Filed: Jun. 5, 2019

(65) Prior Publication Data

US 2019/0284917 A1 Sep. 19, 2019

Related U.S. Application Data

(62) Division of application No. 14/804,717, filed on Jul. 21, 2015, now Pat. No. 10,358,902, which is a division of application No. 13/683,430, filed on Nov. 21, 2012, now abandoned.

(60) Provisional application No. 61/563,323, filed on Nov. 23, 2011.

(51) Int. Cl.
| | |
|---|---|
| *C09K 8/62* | (2006.01) |
| *E21B 43/26* | (2006.01) |
| *C09K 8/84* | (2006.01) |
| *E21B 43/16* | (2006.01) |
| *E21B 43/24* | (2006.01) |
| *C09K 8/70* | (2006.01) |

(52) U.S. Cl.
CPC .............. *E21B 43/26* (2013.01); *C09K 8/62* (2013.01); *C09K 8/70* (2013.01); *C09K 8/84* (2013.01); *E21B 43/168* (2013.01); *E21B 43/24* (2013.01); *C09K 2208/10* (2013.01)

(58) Field of Classification Search
CPC ... C09K 8/84; C09K 8/70; C09K 8/62; C09K 2208/10; C09K 2208/32; C09K 8/68; C09K 8/80; C09K 8/516; C09K 2208/08; C09K 8/514; C09K 8/665; C09K 8/685; C09K 8/805; C09K 2208/26; C09K 8/032; C09K 8/08; C09K 8/12; C09K 8/506; C09K 8/5083; C09K 8/512; C09K 8/52; C09K 8/582; C09K 8/66; C09K 8/90; C09K 2208/12; C09K 2208/28; C09K 8/03; C09K 8/035; C09K 8/06; C09K 8/10; C09K 8/50; C09K 8/57; C09K 8/58; C09K 8/607; C09K 8/608; C09K 8/703; C09K 8/74; C09K 8/86; C09K 8/905; C09K 8/92; H01G 11/36; B82Y 30/00

See application file for complete search history.

(56) References Cited

U.S. PATENT DOCUMENTS

| | | | | |
|---|---|---|---|---|
| 4,219,083 | A * | 8/1980 | Richardson | C09K 8/60 166/300 |
| 4,410,041 | A | 10/1983 | Davies et al. | |
| 4,454,918 | A | 6/1984 | Richardson et al. | |
| 4,482,016 | A * | 11/1984 | Richardson | C09K 8/72 166/300 |
| 4,832,123 | A * | 5/1989 | Abou-Sayed | C09K 8/52 166/281 |
| 4,844,163 | A * | 7/1989 | Hazlett | C09K 8/518 166/270 |
| 4,846,277 | A | 7/1989 | Khalil et al. | |
| 4,986,354 | A | 1/1991 | Cantu et al. | |
| 5,183,581 | A | 2/1993 | Khalil et al. | |
| 5,411,093 | A * | 5/1995 | Jennings, Jr. | C09K 8/62 166/300 |
| 5,639,313 | A | 6/1997 | Khalil | |
| 5,911,923 | A | 6/1999 | Work et al. | |
| 6,326,335 | B1 | 12/2001 | Kowalski et al. | |
| 6,401,816 | B1 | 6/2002 | Price et al. | |
| 6,841,593 | B2 | 1/2005 | Kommareddi et al. | |
| 7,216,704 | B2 | 5/2007 | Hanes, Jr. et al. | |
| 7,334,640 | B2 | 2/2008 | Hanes, Jr. et al. | |
| 7,810,562 | B2 | 10/2010 | Tu et al. | |
| 2003/0221831 | A1 * | 12/2003 | Reddy | C09K 8/473 166/293 |
| 2004/0214927 | A1 * | 10/2004 | Nitzsche | C09D 17/00 524/88 |
| 2009/0114450 | A1 | 5/2009 | Watkins et al. | |
| 2009/0192053 | A1 | 7/2009 | Crews et al. | |
| 2010/0267594 | A1 | 10/2010 | Rana et al. | |

(Continued)

OTHER PUBLICATIONS http://en.wikipedia.org/w/index.php?title=Copper downloaded on Apr. 11, 2014.*
"http://en.wikipedia.org/w/index.php?title=Copper" downloaded Apr. 11, 2014; 12 pages.

(Continued)

*Primary Examiner* — Kumar R Bhushan
(74) *Attorney, Agent, or Firm* — Bracewell LLP; Constance R. Rhebergen

(57) ABSTRACT

Provided is a method and composition for the in-situ generation of synthetic sweet spots in tight-gas formations. The composition can include gas generating compounds, which upon activation, exothermically react to generate heat and gas. The method of using the composition includes injecting the composition into a tight-gas formation such that upon activation, the heat and gas are generated, resulting in the formation of fractures and microfractures within the formation.

10 Claims, 2 Drawing Sheets

(56) References Cited

U.S. PATENT DOCUMENTS

2010/0270031 A1* 10/2010 Patel .................. E21B 33/1208
                                                        166/376
2013/0199781 A1*  8/2013 Dale ................... E21B 43/267
                                                        166/268

OTHER PUBLICATIONS

PCT International Search Report and The Written Opinion of the International Searching Authority, dated Feb. 4, 2013; International Application No. PCT/US2012/066337; International Filing Date: Nov. 21, 2012.
Persyn J.T., and Oxley, J.D., Micro encapsulation Nano, 2011, Southwest Research Institute, San Antonio, Texas, rnicroenc. apsulation,swri,org_.

* cited by examiner

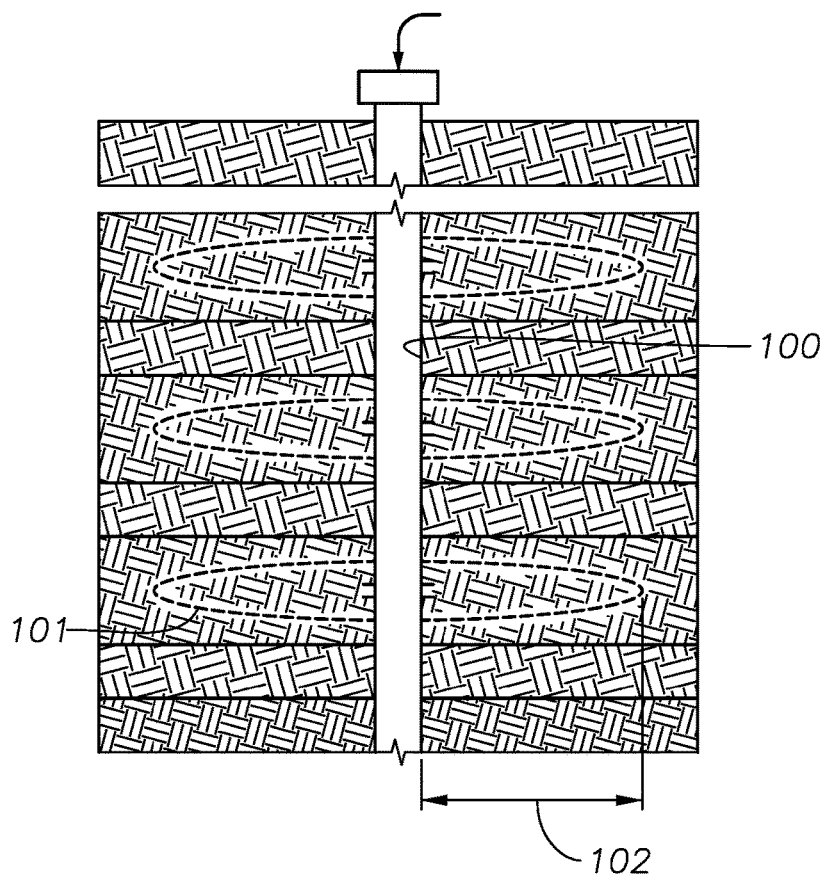
FIG. 1
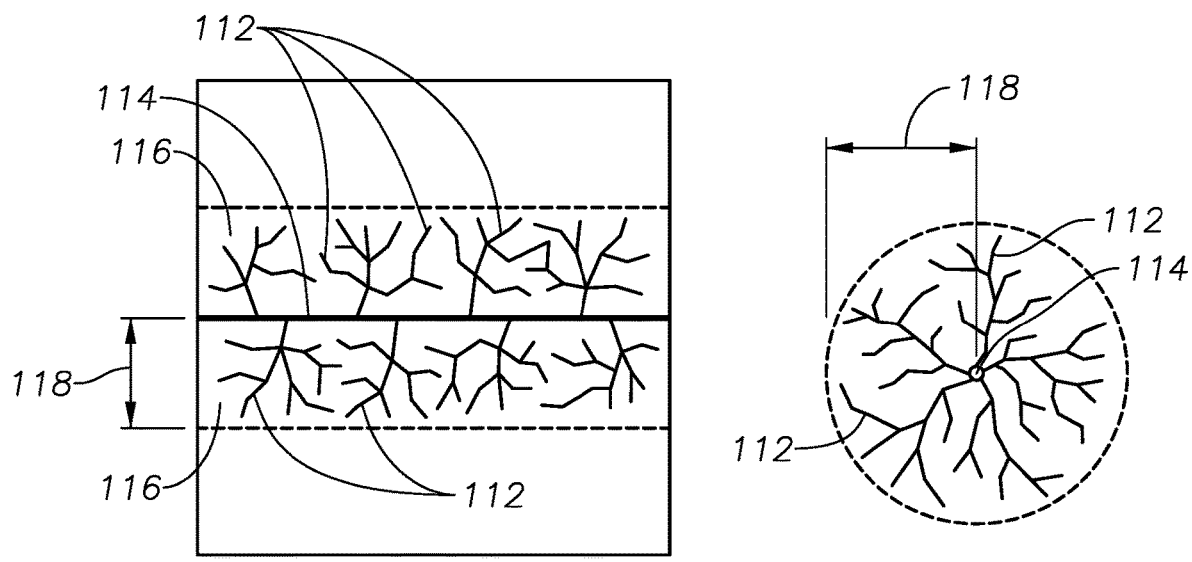
FIG. 2
FIG. 3

SYNTHETIC SWEET SPOTS IN TIGHT FORMATIONS BY INJECTION OF NANO ENCAPSULATED REACTANTS

RELATED APPLICATIONS

This application is a divisional application of U.S. patent application Ser. No. 14/804,717, filed on Jul. 21, 2015, which is a divisional application of U.S. patent application Ser. No. 13/683,430, filed on Nov. 21, 2012, which claims priority to U.S. provisional patent application Ser. No. 61/563,323, filed Nov. 23, 2011, all of which are incorporated herein by reference in their entirety.

FIELD OF THE INVENTION

This invention relates to methods for preparing synthetic sweet spots in tight hydrocarbon containing formations.

BACKGROUND OF THE INVENTION

The search for and recovery of oil is becoming increasingly difficult as world-wide petroleum reserves decline. In many instances, reserves trapped within certain low permeability formations, such as certain sand, carbonate, and/or shale formations, exhibit little or no #5912225.1 production, and are thus economically undesirable to develop at current oil and gas prices. In certain unconventional formations, such as low permeability formations, the most important element that determines whether developing reservoir will be economically viable is finding sweet spots in the reservoir. It is well established that tight gas wells can become commercially viable when a sweet spot is encountered. A sweet spot is generally defined herein as the area within a reservoir that represents the best production or potential for production. Unfortunately, current technologies are unable to locate or predict when and where sweet spots exist within a given formation.

Tight sands and shale are gas bearing but very low permeability formations, and thus present difficulties in recovering hydrocarbons therein. Due to the high demand on clean fuels, however, they are becoming important development targets. To make these low permeability formations suitable for producing commercial quantities of gas, stimulation using massive hydraulic fracturing is typically required. Generally, hydraulic fracturing stimulation treatments aim to maximize the sand face surface exposed to the producing well. The stimulation process also entails activating the near well bore fractures to enhance the conductivity of the sand face. The fracturing treatment is often logistically very challenging and therefore can be commercially very cumbersome. What makes production from tight sands and shale more promising, and therefore more commercial, is when the well is placed in a prolific area of the reservoir. This area is referred to by geologists and reservoir engineers as sweet spot. In some rare and lucky occasions, a sweet spot is encountered where a well is drilled. The economics are therefore significantly improved if a well encounters a sweet spot of the reservoir. The chances of encountering the sweet spot, however, are low.

Exploration efforts and research have focused on searching for reservoir sweet spots to improve project economics and maximize well success. Sweet spots, however, are often merely very thin streaks in tight formations. The current exploration technologies are, to a certain extent, helpless in detecting them.

In tight reservoirs, due to low permeability of the formation, well productivity is typically low, thus making the well non-economical from a standpoint of development. Stimulation treatments are one known method that can be used to enhance well productivity and improve the economics of developing the well. One commonly employed technique for stimulating low productivity wells is massive hydraulic fracturing, which typically involves the injection of high viscosity fluids into the well at a sufficiently high rate so that enough pressure is built up inside the wellbore to split the formation apart. Often these hydraulic fracturing treatments must be done in several stages to maximize reservoir contact and reservoir volume that is stimulated. The resulting hydraulically induced fracture that is produced extends from the wellbore deep into the formation.

Stimulation procedures can employ several techniques to insure that the induced fracture becomes conductive when injection is ceased. For example, during acid fracturing of carbonate formations, acid based fluids are injected into the formation to create an etched fracture and conductive channels, which are left open upon closure of the fracture. In use with sand or shale formations, a proppant can be included with the fracturing fluid such that the induced fracture remains propped open as it closes. These methods, however, have limited uses. For example, because shale and sandstone formations do not react with acids, acid stimulation fluids are typically not employed, and only hydraulic fracturing with proppants is employed, and multiple stages of fracturing are frequently necessary. Multistage fracturing has raised many concerns due both to the high cost and because of the very large amounts of water that are required.

Thus, additional needs exist for the ability to enhance production within a tight gas formation to enhance production thereof. Specifically, methods and compositions having low environmental impact are needed for the creation of synthetic sweet spots.

SUMMARY

Generally, methods and compositions for the creation of synthetic sweet spots are provided.

In one aspect, a reaction mixture for the in-situ generation of gas within tight gas wells for the formation of synthetic sweet spots is provided. In general, the reaction mixture can include an encapsulated reactant, which is capable of reacting exothermically to produce gas and heat. The reactant can be encapsulated with a material that has a defined erosion rate under formation conditions. The reaction mixture can include a hydraulic fracturing fluid.

In certain embodiments, a method for stimulating production of gas in a tight-gas formation is provided. The method comprising the steps of: injecting into the formation an aqueous solution that includes at least one encapsulated reactant, the reactant being capable of reacting exothermically to produce a volume of gas. The encapsulated reactant includes a coating allowing for a delayed erosion thereof, wherein upon erosion of the encapsulating coating the reactant exothermically reacts to produce a volume of gas. Upon producing the volume of gas, the fractures and microfractures are created within the formation, thereby improving production therefrom.

BRIEF DESCRIPTION OF THE DRAWINGS

FIG. 1 is a schematic of one embodiment.
FIG. 2 is a schematic of one embodiment.

FIG. 3 is a top view schematic of the embodiment shown in FIG. 2.

DETAILED DESCRIPTION OF THE INVENTION

Figure 4:
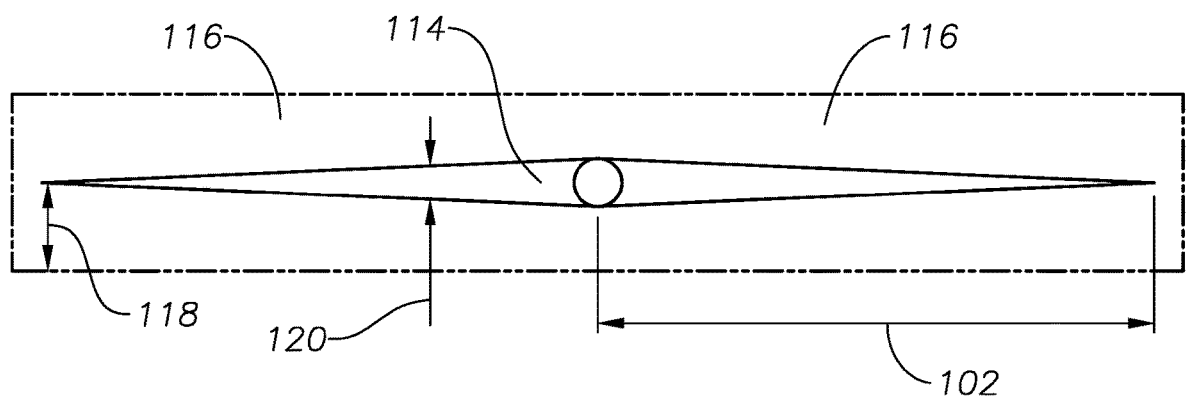
FIG. 4 is a schematic of one embodiment.

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, on the claimed invention.

In certain embodiments, the compositions provided herein provide a means of introducing a stimulated digenesis process that will synthetically create sweet spots in the reservoir where the sweet spots did not previously exist. The nano particles are encapsulated and released only upon a specific triggering mechanism, such as temperature or coming into contact with water or some other triggering solvent, to ensure deep penetration beyond the wellbore or fracture plane. Upon release, the encapsulated nano particle payload (i.e., the material within the encapsulation layer) mixes with formation water causing a reaction that generates hot and pressured gas and effectively creates new micro fractures within the invaded matrix. The in-situ generation of gas in tight formation results in an increased localized pressure due to the extremely low permeability, resulting in micro-fracturing. The microfracturing of the formation, thus improves the reservoir near wellbore or near-fracture permeability.

As used herein, "sweet spot" refers to an area of a reservoir where the petrophysical properties such as permeability and porosity are distinctly improved as compared with the rest of the reservoir.

As noted previously, drilling into those sweet spots can be the difference between a productive well and an unproductive well. The methods described herein provide for the injection of nano-encapsulated chemicals that react vigorously with formation water or other reactants, thus causing micropores and micro fissures in the tight formation to blister as a result of the hot gases and therefore high pressures resulting from exothermic reaction that creates and localized stresses inside the tight formation pores. This stress effect will cause the formation pores to inflate and the fissures to be more conductive thus the rock matrix will be more permeable to fluids; thus a sweet spot is artificially created around the drilled well, or near the fracture surface if the process is incorporated with the conventional hydraulic fracturing treatment.

The methods described herein are directed to the generation of sweet spots at or near a fracture induced during a hydraulic fracturing procedure. When the present technique is utilized during hydraulic fracturing treatments, a synthetic sweet spot can be created, thereby stimulating production and enabling maximum enhancement of gas production. The technology and the techniques described herein thus can greatly increase the chances of recovering gases from low permeability reservoirs and will improve the economics of the development thereof.

Hydraulic fracturing operations include the steps of injecting a viscous fluid, preferably an aqueous fluid, into the wellbore at a high flow rate such that enough pressure is created inside the wellbore to cause fractures in the formation. Generally, the fracture produced during hydraulic fracturing can extend deep into the formation. For example, depending upon the formation properties and the volume of fluids used to stimulate the formation, the resulting fracture can extend up to about 50 meters into the formation, alternatively at least about 100 meters into the formation. Additionally, the hydraulic fracturing process can be designed such that the fracture extends outward from the wellbore in multiple directions.

FIG. 1 is a schematic drawing of a wellbore used for hydraulic fracturing operations, wherein a viscous fluid, preferably an aqueous fluid, is injected into the wellbore 100 at a high flow rate such that enough pressure is created inside the wellbore to cause fractures in the formation. Generally, the fracture produced during hydraulic fracturing can extend deep into the formation, as shown in the region of hydraulic fracturing 101. For example, as shown in FIG. 1, the length of the fracture 102 is shown to extend into the formation. In some embodiments, the length of the fracture can extend from 25 to 100 meters. Additionally, the hydraulic fracturing process can be designed such that the fracture extends outward from the wellbore in multiple directions.

FIG. 2 shows the propagation of microfractures 112 within and extending from the fractures 114 produced as a result of the hydraulic fracturing procedure, thus creating sweet spots 116. Generally, depending upon the reactants and the volume of nitrogen gas produced therefrom, the microfractures 112 can extend throughout pseudo fracture width 118 from the initial fracture created during hydraulic fracturing. FIG. 3 similarly shows the top view of the same.

FIG. 4 is another schematic demonstrating the generation of sweet spots 116 within the formation. The figure shows the length of fracture 102 that can extend through the formation. In some embodiments, this length of fracture 102 can extend up to 100 meters. In some embodiments, this length of fracture 102 can extend up to 50 meters. In some embodiments, this length of fracture 102 can extend up to 25 meters. The figure shows that the fracture width 120 that results utilizing known fracturing techniques. In some embodiments, this fracture width is about 0.5 centimeters. In other embodiments, this fracture width is less than 0.5 centimeters. Utilizing the compositions and methods described herein, however, provide the surprising result of a pseudo fracture width 118, such that a sweet spot is created at and around the fracture site. In some embodiments, this pseudo fracture width is 1-3 meters in width.

Thus, provided herein are methods and compositions for the stimulation of tight gas wells to generate synthetic sweet spots to increase well productivity. The methods and compositions can, in certain embodiments, be utilized in conjunction with standard hydraulic fracturing techniques. For example, in certain embodiments, the well stimulation process can include the injection of certain composition during the hydraulic fracturing process. In alternative embodiments, the well stimulation process can involve the steps of first injecting fluid into the hole at a sufficiently high injection rate to build enough pressure in the wellbore, across treated formation, to initiate and propagate a hydraulic fracture in the referenced formation, followed by the injection of the gas generating composition. In certain embodiments, a portion of the reactants are supplied with the hydraulic fracturing fluid, and the remainder of the reactants are supplied separately, after the initial hydraulic fracturing has occurred. In certain other embodiments, in a multi-stage fracturing procedure, encapsulated reactants are included in the hydraulic fracturing fluids during each stage of the fracturing process.

In one aspect, a composition is provided for creating synthetic sweet spots. The composition can include one or more reactants, which can be encapsulated with a material that protects the reactant. In most embodiments, it is desired that the reactants be allowed to migrate deep into the formation before reacting and generating the synthetic sweet spot. Thus, in certain embodiments, the reactants are coated with a material that releases over time upon exposure to one or more condition selected from increased temperature, or contact with water, acid, or a hydrocarbon. In certain embodiments, a single reactant is encapsulated and can be injected into a formation, wherein upon the dissolution or erosion of the encapsulating material, the single reactant can exothermically react with water or other reactants in the formation to form the synthetic sweet spot. In alternate embodiments, two or more reactants can be encapsulated and injected into a formation, wherein upon dissolution or erosion of the encapsulating materials, the reactants can react exothermically with each other or water to form the synthetic sweet spot.

A number of reactants which react exothermically with water are known in the art. In some embodiments, the reactant includes sodium dithionite. In other embodiments, the reactant includes lithium aluminum hydride.

In certain embodiments, the reactants can be components of a redox reaction such that one component is a oxidizing agent and the other component is a reducing agent, and wherein upon contact, the oxidizing agent and the reducing agent exothermically react, generating gas and heat. In certain embodiments, the reactants can react to generate nitrogen gas. As noted previously, the generation of the gas, in addition to causing stress to the surrounding formation, creates an area of localized pressure. By creating an area of localized pressure within the formation, micro-fracturing of the nearby strata occurs; thereby improving the permeability of near fracture surface of the formation. The method can include the step of supplying a composition that includes compounds containing exothermic reactants to the formation, which can then react to generate heat and gas, such as nitrogen. In certain embodiments, all or a portion of the oxidation-reduction composition can be incorporated with fracturing fluids and injected during a hydraulic fracturing treatment.

Figure 5:
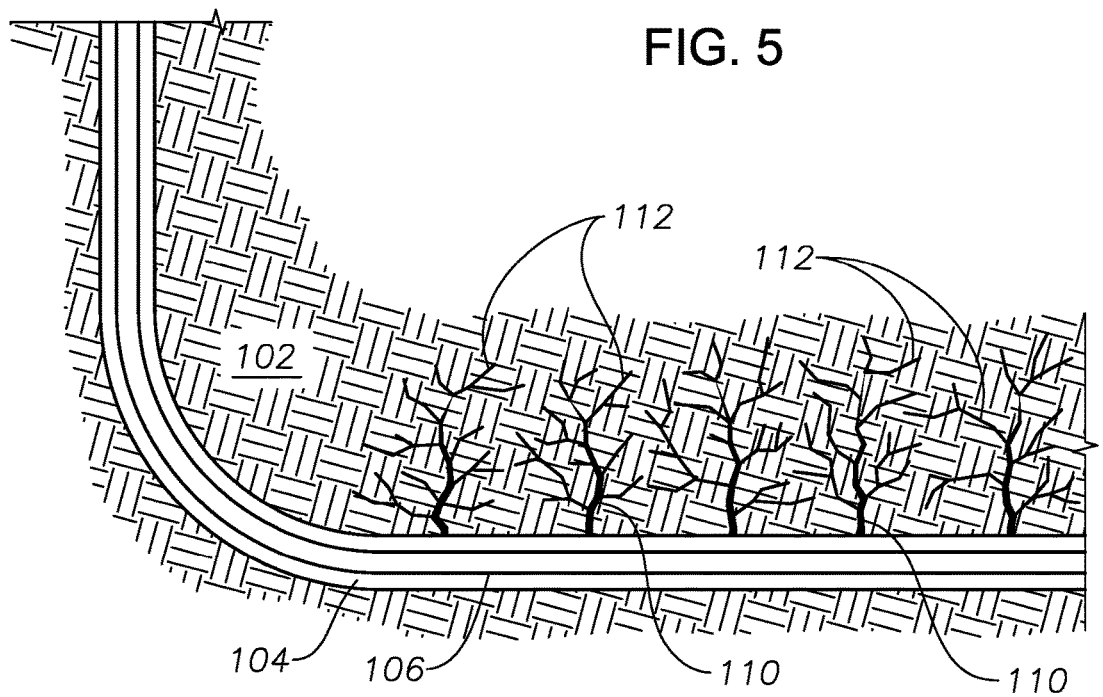
FIG. 5 is a schematic of one embodiment.

FIG. 5 shows an embodiment of the invention, wherein the gas produced by the reaction is predicted to migrate into the fractures created within the formation during the hydraulic fracturing to form additional microfractures within the formation. Referring now to FIG. 5, wellbore 104 is within formation 102. Drill pipe 106 is positioned within wellbore 104. Following a hydraulic fracturing process, large fractures 110 exist within formation 102, extending outward from wellbore 104. Upon reaction, the injected fluids produce gas and heat, thereby causing microfractures 112 to be created within the formation, thereby providing pathways for the hydrocarbon molecules trapped within the formation to migrate and be recovered.

Suitable encapsulation materials can include certain polymers, which dissolve or erode at a delayed rate upon exposure to water, heat, and/or pressure, as will be experienced within the formation. In certain embodiments, the encapsulating material can be hydrated to form a solid matrix with the component.

In one embodiment, a method is provided for creating a synthetic sweet spot within a tight-gas formation. In certain embodiments, the hydraulic fracturing process(es) are effective for the creation of major fractures within the formation, and the encapsulated reactants are effective, through the exothermic reaction and resulting production of gas, in creating microfractures within the formation. Subsequent hydraulic fracturing procedures can result in the propagation of the microfractures within and extending from the major fractures produced as a result of the hydraulic fracturing procedure. Generally, depending upon the reactants and the volume of nitrogen gas produced therefrom, the microfractures can extend up to about half a meter, alternatively up to about meter, from the initial fracture created during hydraulic fracturing.

The in-situ generation of nitrogen and heat (and resulting increase in pressure within the formation at the reaction site), increases the permeability of tight gas formations. The heat and gas that are generated by the reaction can cause tensile and thermal fractures within the hydraulically induced and within the existing fractures in the formation. It is understood that the generation of the microfractures within the formation may depend on the type of formation being treated.

As noted previously, the encapsulating material dissolves or erodes from the reactant at a desired rate such that the reactant does not react immediately upon contact with the water. In certain embodiments, it is advantageous for the hydraulic fracturing to cause fractures and microfractures within the formation before the reactant reacts exothermically. It is believed that the presence of fractures and microfractures within the formation will be enhanced upon the generation of heat and a volume of gas. Additionally, it is believed that the use of the methods and compositions described herein will allow for fewer stages to be employed in a multistage hydraulic fracturing process, as compared with hydraulic fracturing processes that do not employ the compositions described herein.

In certain embodiments, the method can include the steps of injecting an encapsulated reducing agent (or reducer) and an encapsulated oxidizing agent (or oxidizer) into a formation, optionally followed by the injection of an activator. In certain embodiments, the optional activator can be an acid. In certain embodiments, heat from the formation can act as an activator to the reactants.

The amount of encapsulated reducing agent (or reducer) and encapsulated oxidizing agent (or oxidizer) injected into a formation will depend on a number of factors, including the zone to be stimulated, the porosity of the given formation, and the presence of a diluting agent such as a liquid or a gas. In some embodiments, the diluting agent is an inert gas. In some embodiments, the inert gas is nitrogen.

The gas that is generated from the exothermic reaction and the low local permeability favor an increase in pore pressure, thus causing the initiation of microfractures at or near the induced fracture. The result is the stimulation of the fracture surface, rather than damage to the formation, which is frequently the case during hydraulic fracturing. In many ways, the stimulation process provided herein is less harsh or severe than the prior art stimulation techniques, and helps to eliminate damage to the formation that is frequently encountered with the prior art techniques. This results in additional conductivity within the formation near the fracture. Additionally, the inclusion of the reactants with the hydraulic fracturing fluids, and the subsequent production of synthetic sweet spots, can help to reduce the overall number of stages necessary during the hydraulic fracturing procedures. This is an additional advantage of the methods disclosed herein over the prior art stimulation methods.

In certain embodiments, an aqueous composition that includes encapsulated ammonium ions and nitrite ions can be injected into a formation, wherein the water and heat of the formation are sufficient to erode the encapsulating material such that the reactants are then allowed to react, thereby producing heat and a volume of gas. As noted previously, upon generation of the volume of gas, a synthetic sweet spot is created, which leads to increased production of hydrocarbons, such as natural gas, therefrom. The heat of the formation, the acid, or the aqueous water of the formation can all play a role in the erosion or removal of the encapsulating material, which then results in the release of the reactants.

In another embodiment, a fracturing fluid, that optionally include a proppant suspended therein, can be utilized. In one embodiment, the proppant containing fracturing fluid can be injected into the formation prior to the injection of the composition that includes the encapsulated reactants, thereby producing fractures into which the encapsulated materials can migrate. In alternate embodiments, the composition that includes the encapsulated reactants can be injected into the formation approximately 15 minutes after the completion of the injection of the fracturing fluid injection, alternatively approximately 30 minutes after the completion of the injection, alternatively approximately 1 hour after the completion of the injection. The water and/or the heat of the formation can erode the encapsulating material such that the reaction is delayed, thereby allowing the reactants to migrate and seep into the fractures within the formation.

In certain embodiments, the fluids used in this application can include certain chemical additives that can help to form a viscous fracturing fluid. The chemical additives can include at least one solvent and at least one polymer that is soluble in the solvent. The solvent can also include water and/or a surfactant, depending on the type of formation being treated. The polymer can be mixed with the solvent or water to form a viscous fluid. Following injection of the reactants, the reaction can occur and thereby create a synthetic sweet spot. The created synthetic sweet spot will have higher pressure than surrounding formation rock, but the pressure that is generated will be at least partially consumed to generate fractures in the formation. If the pressure was not high enough to break the formation, however, then the local increase in pressure is analogous to a sweet spot itself, because the increase in pressure will assist in producing hydrocarbons from the reservoir. The main intention of certain methods and compositions described herein, however, is to generate sufficient pressure to cause microfractures, thereby increasing the porosity and permeability of formation.

In some embodiments, the encapsulated reactants described herein include an encapsulating shell. The encapsulating shell can be of varying thickness. The thickness of the encapsulating shell can be selected based on the duration needed between encapsulation and the time at which the reaction is to be triggered. Among the factors to consider in selecting the thickness of the encapsulating shell include the time taken by the reactants to reach the desired location and the conditions (such as temperature and pressure) at which the encapsulating shell will start to deteriorate. Additionally, the amount of water in a given formation may be a relevant factor, particularly for reactions involving reactants which react exothermically with water.

Additionally, the size of the encapsulating shell will be influenced base on the pore size of the formation. Appropriate encapsulating shell sizes, and size distributions should be selected based on the pore size of the formation and the pore size distribution of the formation.

The encapsulating materials described herein are well known in the art. Any known encapsulating agents may be selected for use in this invention.

Generally, during successful hydraulic fracturing procedures, the fracturing liquid must be removed from the well upon completion of the stimulation treatment. The removal process can be both costly and time consuming. Advantageously, the compositions and methods described herein are designed to cause no damage to the formation, which is a challenge considering the current fracturing technologies. To overcome this problem, the compositions and methods described herein advantageously utilize novel combinations of gas generating chemicals as the hydraulic fracturing liquid-base. Thus, in certain embodiments, the liquids used for fracturing of the formation, which can include the gas generating chemicals previously described, can be injected into the formation though the wellbore or other injection means at a sufficiently high injection rate so as to create pressures within the formation that can effectively fracture the rock or open previously existing fractures. As the fracturing liquid seeps into the formation, these gas generating chemicals can then be triggered to react, as previously discussed, thereby generating large amounts of gas and heat within the formation and near the newly created fracture surfaces. In certain embodiments, the triggering mechanism can be the heat of the formation temperature. In alternate embodiments, the triggering mechanism can be an injected fluid, such as an acid, that can be injected at the end of the fracturing process. Alternatively, the triggering mechanism can be water present in the formation. The gas and heat that are generated can create additional microfractures and/or thermal fractures at or near the fracture that is formed as a result of the hydraulic fracturing.

Advantageously, in contrast to some currently employed stimulation methods, the methods and compositions described herein do not produce any damaging by-products as a result of the in-situ reaction. For example, the heat of the formation can be used as the activator, such that there are no chemicals remaining in the formation that may cause environmental concerns. As a result, following the stimulation procedure, no clean-up procedure is required, thereby eliminating additional costs and time. Thus, through the creation of the synthetic sweet spots, maximum enhancement of gas production with a minimal creation of damaging waste products is provided.

In certain embodiments, the methods and compositions described herein advantageously and unexpectedly eliminate formation damage that can be caused by the use of a fracturing gel, water blockage, and/or condensate banking. These conditions have been known to result in reduced permeability of liquid and gaseous fluids within the formation, and subsequently lead to poor production from the well. The generation of the synthetic sweet spot according to the methods described herein advantageously and unexpectedly avoids these problems.

In certain embodiments, the methods and compositions described herein advantageously and unexpectedly create synthetic sweet spots in tight-gas reservoirs that lack the presence of such important flow-supporting stratas. As noted previously, a sweet spot is an area of maximum production within a formation. These formation frequently lack the pathways that allow for the flow of hydrocarbon fluids and gases to a point of production.

The methods and compositions provided herein solve several problems that are frequently encountered during the construction of commercial wells in tight-gas reservoirs.

First, problems associated with damage to the formation caused by current hydraulic fracturing methods are eliminated. For example, the methods and compositions described herein, advantageously eliminate fracturing-fluid filtrate that can be locked near a recently created fracture surface by creating many tensile fractures near the fracture surface such that any filtrate readily flows through these fractures toward the well.

Second, the methods and compositions provided herein, advantageously and unexpectedly enhance production over traditional hydraulic fracturing methods through the creation of microfractures, which provide additional conductivity to the near fracture surface such that it provides new channels for gas to flow toward the created fracture. The additional reservoir volume contacting the well significantly contributes to the overall flow efficiency of the drainage area being affected by the induced fracture.

Finally, current hydraulic fracturing techniques that require many fracturing stages to create sufficient reservoir volume contact within the well to be commercial are eliminated as a result of the production of microfractures due to the gas and heat that are produced. By reducing the number of required fracturing stages for same production, the present stimulation treatment described herein is both more cost effective and accomplished more quickly; thereby providing viable economical options for the stimulation of low producing wells.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

That which is claimed is:

1. A method for stimulating production of gas in a tight-gas formation, the method comprising the steps of:
   injecting into the formation an aqueous solution comprising at least one encapsulated nano particle reactant, the at least one encapsulated nano particle reactant comprising a reactant and a coating, the reactant being capable of reacting exothermically to produce a volume of gas, wherein the reactant is a component of a redox reaction and is selected from the group consisting of an oxidizing agent and a reducing agent;
   allowing the at least one encapsulated nano particle reactant to migrate into fractures in the formation;
   allowing a delayed erosion of the coating, wherein erosion of the coating releases the reactant;
   allowing the reactant to react exothermically to produce the volume of gas;
   creating an area of localized pressure within the formation due to the volume of gas; and
   producing fractures and microfractures due to the localized pressure, thereby improving production therefrom.

2. The method of claim 1, further comprising the step of:
   allowing the at least one encapsulated nano particle reactant to migrate deep into the formation before reacting.

3. The method of claim 1, wherein the step of allowing the delayed erosion of the coating begins upon a specific trigger mechanism.

4. The method of claim 3, wherein the specific trigger mechanism is selected from the group consisting of increased temperature, contact with water, contact with acid, contact with hydrocarbon, and combinations thereof.

5. The method of claim 1, wherein the volume of gas is nitrogen.

6. The method of claim 1, wherein the step of allowing the reactant to react exothermically further produces heat.

7. The method of claim 1, wherein the step of injecting into the formation the aqueous solution comprising the at least one encapsulated nano particle reactant is repeated multiple times.

8. The method of claim 1, wherein the aqueous solution includes an additional reactant.

9. The method of claim 1, wherein the reactant reacts exothermically with water.

10. The method of claim 1, wherein the reactant is selected from the group consisting of ammonium ions, nitrite ions, and combinations of the same.

* * * * *